United States Patent

[11] 3,632,346

[72] Inventor Samuel E. Sherba
Willingboro, N.J.
[21] Appl. No. 725,497
[22] Filed Apr. 30, 1968
[45] Patented Jan. 4, 1972
[73] Assignee Rohm and Haas Company
Philadelphia, Pa.

[54] PROCESS FOR RENDERING INNOCUOUS FLATULENCE-PRODUCING SACCHARIDES
24 Claims, No Drawings

[52] U.S. Cl. .................................................. 99/98,
99/64, 195/4
[51] Int. Cl. ......................................................... A23l 1/20
[50] Field of Search ........................................ 99/98, 64,
100; 195/4

[56] References Cited
UNITED STATES PATENTS
2,278,468 4/1942 Musher .......................... 99/98
2,967,108 1/1961 Smith et al. ..................... 99/98
3,220,851 11/1965 Rambaud ....................... 99/98
3,243,301 3/1966 Hesseltine et al. ............. 99/98

OTHER REFERENCES

Bender, Hans and Wallenfels, Kurt Pullulamase (an Amylopectin and Glycogen Debranching Enzyme) From Aerobacter Aerogenes, Methods of Enzymology Vol. VIII Complex Carbohydrates, Academic Press, 1966 pp. 555–559

Markley, Soybeans and Soybean Products Vol. I Interscience Publishers Inc. New York 1951 pp. 342–344

*Primary Examiner*—A. Louis Monacell
*Assistant Examiner*—William A. Simons
*Attorneys*—Francis D. Neruda, George W. F. Simmons and Carl A. Castellan

ABSTRACT: This invention is directed to a process for rendering innocuous flatulence-producing saccharides in foodstuffs by contacting such with an enzyme preparation capable of hydrolyzing the 1, 6 linkages of stachyose in an amount and for a time which is effective to hydrolyze said flatulence-producing saccharides.

PROCESS FOR RENDERING INNOCUOUS FLATULENCE-PRODUCING SACCHARIDES

This invention relates to a method of reducing the tendency in certain foodstuffs to cause flatulence. More particularly, this invention relates to a method of treating materials having flatulence-producing saccharides incorporated therein. Still more particularly, this invention relates to an enzymatic method of rendering innocuous flatulence-producing saccharides.

The recitation "flatulence-producing saccharide(s)" as employed herein is intended to designate those carbohydrate materials which normally are not hydrolyzed by tissue enzymes in the mammalian intestine. By the recitation "tissue enzymes" is meant those enzymes produced in animal tissue which are separate and distinct from those derived from micro-organisms and plant tissues. Such carbohydrate materials are typically saccharides and further characterized by containing uncommon linkages between the hexoses, such as $\alpha$ 1,6.

The term "foodstuff(s)" as utilized herein refers to and encompasses thereby any material, substance, composition of matter, derivative or combination thereof which may be utilized as a food in the body of a living organism to sustain growth and/or to furnish energy and the like. Foodstuffs may comprise many different components, such as for example, carbohydrates, proteins, fats, minerals, vitamins etc.

As noted previously, certain carbohydrates are not readily hydrolyzed in the intestine, hence, they tend to ferment when subjected to the normal bacterial flora present therein. Such fermentation results in the production of gas, that is, flatulence. Needless to say, the presence of any of these carbohydrates in any foodstuff, food additive, food supplement or the like significantly detracts from its value as such. In point of fact, many foodstuffs containing such carbohydrates are rendered essentially useless as foods. This is, of course, due to the fact that the discomfort caused by flatulence is highly undesirable, not only in human beings but likewise in animals. After all, excessive gas production in men and animals may result in severe pain, bloating and other serious physical difficulties. In livestock, poultry and the like, excessive flatulence will generally result in decreased yields along with the inherent economic losses resulting therefrom.

Accordingly, there has been a continual search for means whereby the flatulence-producing saccharides in any foodstuff containing such could be rendered innocuous. There have been some suggestions in the art that certain lactases could be employed to destroy the flatus factor in soybeans and baked beans. However, experimentation with such lactases has shown that they lack any significant ability to reduce or destroy the tendency of such foodstuffs to cause flatulence. Hence, by providing an enzymatic means to accomplish such, the present invention represents a significant advance in the art. As utilized herein, the recitation "rendered innocuous" in reference to flatulence-producing saccharides includes any enzymatic means which affects such flatulence-producing saccharides so as to reduce the flatulence thereof. Such enzymatic means comprises dissipation, alteration, transformation, hydrolysis, fermentation, reduction and the like or any combination thereof.

Any number of foodstuffs comprise to some degree flatulence-producing saccharides. Typically, foodstuffs would include most legumes, such as for example, navy beans, lima beans, soybeans, and peas. Other common foodstuffs containing flatulence-producing saccharides include many nuts, cocoa, rape seed, sorghum, grapes, sugar beets, Japanese artichokes and the like. Thus, before the nutritional value of such materials can be fully utilized, the flatulence-producing saccharides must be rendered innocuous.

One foodstuff of particular value which is especially illustrative of this problem is the soybean. Since soybeans are grown in great quantity and also constitute significant sources of protein, their potential nutritive value is immense. Nevertheless, their food value is somewhat limited because of their flatulence-producing saccharide content. This situation is, of course, also evident in many soybean derivatives. By "soybean derivatives" is meant any composition, solution, emulsion, composition of matter, both full fat and defatted or the like which comprises soybeans to any extent or has been derived therefrom. Residues from soy milk preparations along with the soy milk itself, soy flour, soy meal, soy cakes, soy flakes full or defatted and the like are typical soybean derivatives.

As noted heretofore, flatulence-producing saccharides comprise numerous carbohydrate materials which are somewhat characterized by possessing at least one uncommon linkage, such as $\alpha$ 1,6. Some typical flatulence-producing saccharides include stachyose, raffinose, melibiose, galactobiose, manninotriose, and the like.

The flatulence-producing saccharides in soybeans and soybean derivatives are primarily stachyose and raffinose. Stachyose which constitutes the major portion thereof is a tetrasaccharide which is best designated as galactose $\alpha$ 1,6 galactose $\alpha$ 1,6 glucose $\beta$ 1,2 fructose.

Stachyose and raffinose like other flatulence-producing saccharides tend to remain unhydrolyzed in the upper intestine of human beings and animals. Thus, when the saccharide is fermented by bacteria in the lower bowel, it produces gas which results in substantial discomfort. Accordingly, before soybeans or soybean derivatives are to be utilized as foods, or food additives and the like, it is highly desirable to render innocuous the stachyose, raffinose and any other similar materials therein. The present invention constitutes a process which does just exactly that. Furthermore, the process of this invention is not limited to soybeans or soybean derivatives but it is likewise similarly employed in any foodstuff containing flatulence-producing saccharides.

In essence, the present invention constitutes a means whereby the flatulence-producing saccharides in any foodstuff containing such may be rendered innocuous. More specifically, the present invention provides a novel process which comprises treating a foodstuff containing flatulence-producing saccharides with a Carbohydrase in an amount which is effective to render innocuous the flatulence-producing saccharides therein.

By "Carbohydrase" is meant an enzyme preparation which is capable of hydrolyzing a saccharide containing at least one uncommon linkage, such as $\alpha$ 1,6. Such enzyme preparations are derived from numerous fungal, yeast, and bacterial micro-organisms including various combinations thereof. Of particular value in this respect are enzyme preparations derived from cultures of *Aspergillus* and *Rhizopus* including various strains and mutants thereof. Some typical members of these genera include for example: *A. niger*, *A. oryzae*, *A. parasiticus*, *A. awamorii*, *R. oryzae*, *R. oligosporous* and the like. An exemplary strain of *A. niger*, which is typical of those that might be employed in this invention has been deposited in the American Type Culture Collection wherein such is designated as ATCC No. 20107.

As noted, many yeasts are also excellent sources of Carbohydrase. Of particular significance are cultures of *Saccharomyces* and *Candida*. Within these genera, *S. cerevisiae*, *S. italicus*, *S. carlsbergensis* and *C. pseudotropiclas* are especially preferred.

Likewise, numerous *Bacillus* cultures constitute suitable sources of Carbohydrase. *B. subtilis* is a typical organism which may be so utilized.

A particularly preferable species for the production of Carbohydrase is *Aspergillus niger*. Numerous varieties and strains thereof are readily grown and produce enzyme preparations capable of hydrolyzing a saccharide containing at least one uncommon linkage, such as $\alpha$ 1,6, that is, a Carbohydrase.

Where expedient or advantageous, enzymes or enzyme preparations derived from different cultures of micro-organisms may be combined in any proportion to obtain a Carbohydrase having the desired activity.

For the purposes of this application the Carbohydrase Activity, that is, the activity of any enzyme preparation to render innocuous flatulence-producing saccharides shall be equated to its ability to hydrolyze essentially pure stachyose. Hence, the greater the ability to hydrolyze stachyose, the greater the ability to render innocuous flatulence-producing saccharides when they are incorporated in a foodstuff. This means of indicating activity is merely for convenience and is not to be construed in any way as a limitation or indication as to the manner or mechanism of the invention disclosed herein. Pursuant thereto, Carbohydrase Activity will be expressed in "Carbohydrase Units." More specifically, one Carbohydrase Unit is that amount of enzyme preparation which will produce 61.2 mg. of reducing sugars from 100 mg. of stachyose in a 10-ml. aqueous solution at 50° C. in 16 hours at pH 5.0.

Thus, the Carbohydrase Activity of any particular enzyme preparation may be determined by observing the number of mg. of enzyme preparation required to produce 61.2 mg. of reducing sugars from an aqueous solution containing 100 mg. of essentially pure stachyose after 16 hours. The stachyose solution should be maintained at 50° C. and at a pH of 5.0 for the 16 hours. A formula which is readily utilized in determining the number of Carbohydrase Units per gram in any enzyme preparation is as follows:

$$\text{Carbohydrase units/gm.} = \frac{1000}{\text{Mg. of enzyme preparation required to obtain 61.2 mg. of reducing sugars.}}$$

The Carbohydrase of this invention is, as noted heretofore, derived from growing cultures of micro-organisms. Generally these organisms are grown in either a submerged or surface culture on a medium comprising a utilizable source of energy, assimilable carbon and nitrogen. Of course, any of the regularly employed growth factors and mineral salts or combinations thereof may also be incorporated in such culture media.

Typically, such media may include the well-known Difco Nutrient Broth, as well as mixtures containing sucrose, dextrose, maltose, corn starch, corn steep liquor, soybean meal, gelatin, meat, bone, fish scraps, blood, monosodium phosphate, monoammonium phosphate, magnesium sulfate, calcium carbonate, molasses fortified with high-protein nutrients and the like. While whole wheat bran, whole wheat flour and soybean meal or soybean derivatives are especially desirable constituents in the culture media, numerous cereal grains and other substances such as for example, corn meal, rape seed meal, peanuts and the like are similarly utilizable. A particularly efficacious liquid submerged medium would comprise 0.5 to 10.0 percent whole wheat bran, 0.5 to 15 percent whole wheat flour, 0.1 to 2.0 percent monoammonium phosphate, 0.05 to 5.0 percent calcium carbonate and 0.1 to 20 percent corn steep liquor.

A still more preferable medium would comprise 2 to 4 percent whole wheat bran, 8 to 10 percent whole wheat flour, 0.3 to 0.6 percent monoammonium phosphate, 0.4 to 0.5 percent calcium carbonate and 5 to 10 percent corn steep liquor.

Salts such as monosodium, potassium or ammonium phosphate and the like are usually incorporated in such culture media to the extent of 0.01 to 5 percent and preferably 0.1 to 2 percent by weight of the total medium. These salts are advantageous in preventing a rapid rise in pH during the growth of the organism. This pH control enhances to some extent the rapid production of an enzyme preparation having relatively high Carbohydrase Activity. Likewise, the addition of carbohydrates will also prevent an excessive increase in pH during enzyme production. Carbohydrates will typically be in the form of flours, meals, grains, molasses, starch, acid or enzymatically modified starch, dextrose, sucrose or combinations thereof.

Substantial latitude with respect to the pH range of the culture medium during enzyme production is allowable. However, it has been found that enzyme preparations possessing relatively high levels of Carbohydrase Activity will be obtained when the pH of the culture is maintained during the growth of the organism in the range of 4.0 to 9.0, and preferably, 5.5 to 7.5. Similarly, optimal yields of Carbohydrase necessitate that the growing culture be maintained at a temperature in the range of 20° to 45° C. and preferably in the range of 25° to 35° C. However, as noted hereinbefore, variances will be allowed but the yield and activity of enzymes so obtained may be deleteriously affected.

Maximum enzyme production will be obtained with 24 to 120 hours, depending, of course, on such factors as the particular organism being grown, the total concentration of nutrient solids, pH, temperature, aeration, agitation and the like. However, under the preferred conditions recited herein, the growing cycle may be reduced to 18 hours or extended by the addition of supplemental nutrient to the culture. Maintenance of the organism under the conditions described herein for periods of time in excess of 96 hours will generally not be harmful. However, it is almost always economically preferable to harvest the enzyme preparations as soon as possible after completion of the production cycle. Any of the methodology within the knowledge of those skilled in the art may be utilized in determining at what point the production cycle is completed. When desired, the Carbohydrase Activity of the crude culture may be determined at regular intervals by the means described hereinbefore. Harvesting of the enzyme should proceed when the Carbohydrase Activity has essentially reached its peak or thereabout.

In general, growing of the organism in question on a surface culture will necessitate essentially the same temperature and pH conditions set forth for liquid submerged cultures. However, the medium utilized in a surface culture will usually differ somewhat from that of a submerged culture. For instance, a preferred medium would comprise whole wheat flour, ground soybeans, soybean meal, corn meal, rape seed, beet pulp and the like. Of course, aqueous extracts of this surface culture medium after growth of the organism will exhibit Carbohydrase Activity similar to that obtained by submerged culture.

Numerous processes are available and may be readily employed for the concentration of the enzyme preparations from the crude culture after completion of the growing cycle. Typically, such a method of concentration would include the removal of water from the whole cultures or filtered crude cultures by spray drying, vacuum concentration, lyophilization, or drying on an inert carrier, diluent and the like. Alternatively, the enzyme preparations under consideration may be precipitated with organic solvents and/or inorganic salts. This latter procedure will generally result in products having a relatively high degree of enzyme concentration which may be even more accentuated by carrying out such precipitation under refrigeration. In that the enzyme preparations disclosed herein may be utilized to a great extent in food or feed type materials, this increased purification will be somewhat more desirable. Of course, separation of the enzyme preparations from the crude culture is not absolutely necessary, since they may be effectively employed in that form. The separation and degree of concentration will depend to a great extent upon the ultimate use of the enzyme preparations.

Compositions comprising Carbohydrase are usually prepared by combining such enzyme preparations with inert or substantially inert carriers. By "carrier" is meant any substance or combination of substances which can be utilized to dissolve, dilute, dispense, disseminate or diffuse the enzyme preparation without substantially impairing its effectiveness. The amount of enzyme preparation combined with a carrier in any composition will vary with the desired concentration of Carbohydrase Activity. Generally, such compositions will comprise Carbohydrase in the range of 1 to 99 percent and preferably 5 to 25 percent by weight of the total composition.

A typical composition utilizable in accordance with this invention would be prepared by precipitating Carbohydrase with alcohol from an aqueous extract of the crude culture obtained in the manner noted heretofore. This precipitate which is concentrated Carbohydrase is then incorporated into lactose so as to constitute 10 percent of the total weight of the composition. The Carbohydrase Activity of this composition may then be determined by the means previously described.

As indicated hereinbefore, the process of this invention comprises contacting a foodstuff having flatulence-producing saccharides incorporated therein with a Carbohydrase in an amount which is effective to render innocuous the flatulence-producing saccharides.

Generally and preferably, this process will be carried out in an aqueous solution. The amount of water utilized in such a solution will, of course, vary somewhat with the substrata to be treated, that is, the foodstuff containing the flatulence-producing saccharides. In most circumstances, a minimal amount of water will be employed, that is, only that amount which is sufficient to completely solubilize all of the flatulence-producing saccharide in the material to be treated. Usually and generally, this kind will vary on a weight basis from 0.1 to 100 parts water to one part foodstuff. A preferable water to foodstuff ratio would be 10 to 1 respectively.

The amount of Carbohydrase employed in the process of this invention will, of course, vary not only with the Carbohydrase Activity thereof, but also with the flatulence-producing saccharides to be treated in addition to related processing conditions. It has been found that about 0.1 to 500 and preferably 1.0 to 50 Carbohydrase Units will be effective in rendering innocuous 1 gram of saccharide. However, depending upon the various processing conditions, such as time, temperature, pH, saccharide concentration, etc., it may be possible to use less than 0.1 Carbohydrase Unit for each gram of saccharide. Similarly, in some situations it may require more than 500 Carbohydrase Units. Determination of the requisite amount of Carbohydrase required under any given condition is, of course, within the skill of one knowledgeable in the art.

In general, the process in question is carried out at a pH in the range of about 4.0 to 8.8, and preferably in the range of about 4.5 to 7.5. Depending upon the flatulence-producing saccharides and foodstuffs containing such being treated and the like, various substances can be incorporated therein for pH adjustment and maintenance. Typically, these would include ammonium sulfate, ammonium hydroxide, sodium hydroxide, sodium carbonate, hydrochloric acid, sulfuric acid, acetic acid, lactic acid, adipic acid and the like.

It is generally desirable to maintain the aqueous medium of saccharide-containing material at a temperature in the range of about 20° to 60° C. and preferably at about 30° to 50° C. while such is being contacted with the Carbohydrase. Usually, the process of this invention will proceed more rapidly at the higher temperatures and under agitation. However, the time necessitated for rendering innocuous the flatulence-producing saccharides in any foodstuff by means of the process disclosed herein will, of course, vary with the saccharide, the enzyme concentration and the other conditions noted heretofore. For the most part, it will generally necessitate at least 1 hour and usually as much a 16 hours or longer. Under preferable conditions most flatulence-producing saccharides will be rendered innocuous within 5 to 10 hours.

Numerous means are available for determining when the flatulence-producing saccharides in any particular foodstuff have been rendered innocuous. Generally, this may be done by quantitatively and qualitatively evaluating the sugars therein with gas liquid chromatography or by chemically measuring the amount of reducing sugars obtained. Likewise, the solution may be analyzed for reducing sugar content by the Willstatler Method or other reliable procedures.

As noted hereinbefore, the process of this invention is especially adapted for rendering innocuous the flatulence-producing saccharides in soybeans, and particularly, soybean derivatives such as soy milk.

Full fat soy milk is obtained as a filtrate from water extracted soybeans which have been soaked, dehulled and flaked. Alternatively, the dehulled soybeans may be ground and defatted before water extraction so as to result in defatted soy milk. Nevertheless, soy milk obtained by either process contains a substantial amount of flatulence-producing saccharides primarily in the form of stachyose. By incorporating sufficient Carbohydrase in this milk, the flatulence-producing saccharides are rendered innocuous. Similarly, the solid residue resulting from soy milk produced by either of the above methods may also be treated by the process of this invention.

For a more thorough understanding of this invention and some of its embodiments, the following examples are offered by way of illustration and not by way of limitation.

EXAMPLE 1

A surface medium comprising 20 g. of whole wheat bran, 13 g. of full fat soybean flakes, 2 g. of cornsteep water and 20 g. of distilled water is added to 1-liter wide-mouth jar and capped with cotton stoppers. Following steam sterilization of the medium at 15 p.s.i. for 30 minutes, the flasks are cooled and inoculated with 30 g. of an aqueous suspension of a culture of *Aspergillus niger* ATCC No. 20107 which was grown on Difco Nutrient Agar for 72 hours. The flasks are then incubated in a water bath while being maintained at a temperature in the range of 25° to 30° C. The initial pH of the culture is 4.8. After 96 hours, the jars are removed from the water bath and the culture is harvested and extracted with water to solubilize the enzymes therein. Thereafter, the enzymes in the extract are precipitated with ethanol and dried.

This enzyme preparation is then tested for Carbohydrase Activity. Accordingly, three 10-ml. aliquots of a 1 percent stachyose solution are maintained at 50° C. at pH 5.0 having incorporated therein 10, 20 and 30 mg. respectively of the enzyme preparation prepared above. After 16 hours all three solutions are analyzed for reducing sugars. The results of such analysis are as follows:

| Amount of Enzyme added (mg.) | Reducing sugar produced (mg.) |
| --- | --- |
| 10 | 44.0 |
| 20 | 60.5 |
| 30 | 68.6 |

Thus, by interpolation of this data it follows that 20.8 mg. of enzyme preparation produced 61.2 mg. of reducing sugars. Accordingly, the enzyme preparation has a Carbohydrase Activity of 48 Carbohydrase Units per gram.

EXAMPLE 2

Two aliquots, 1,000 ml. each of soy milk derived from whole ground soybeans and containing 3 percent by weight of total solids are adjusted to a pH of 5.0 with HCl and equilibrated at 50° C. The enzyme preparation of example 1 is incorporated in one aliquot of the soy milk in an amount equal to 0.15 percent by weight of the solids in said soy milk. After 16 hours at 50° C. both samples are analyzed by gas liquid chromatography. The control sample of soy milk, that is, the solution not having the enzyme preparation incorporated therein, evidenced upon analysis the presence of a mixture of stachyose, raffinose, and melibiose constituting 0.05 percent by weight of the total soy milk. These three saccharides, namely, stachyose, raffinose and melibiose are flatulence-producing saccharides. Analysis of the soy milk aliquot having the enzyme preparation incorporated therein does not show the presence of any significant amount of these flatulence-producing sugars.

EXAMPLE 3

Whole ground soybeans were screened through a 20 mesh screen. To 12.5 grams of these ground soybeans, 100 ml. of water was added in a 250 ml. Erlenmeyer flask. The ambient pH of the suspension was 6.3. One hundred milligrams of the enzyme preparation prepared in example 1 is added thereto. This solution is then maintained at 40° C. on a rotating batch shaker set at 270 r.p.m. for 16 hours.

After which time it is removed and filtered through a 100 mesh screen. The liquid filtrate is then lyophilized. Subsequent thereto, the lyophilized material is then analyzed for sugar content by gas liquid chromatography.

A control sample which is maintained in the same manner except that the enzyme preparation is not incorporated therein exhibits 3 percent stachyose, 0.8 percent raffinose, 0.4 percent melibiose based on the weight of the soy milk solids. The treated material shows only 0.36 percent stachyose, with not detectable raffinose or melibiose.

EXAMPLE 4

In a manner similar to example 1, a medium comprising 25 g. of wheat bran, 7 g. of ground soybeans, 5 g. of corn meal and 63 g. of water is utilized to grow a culture of *Rhizopus oryzae*. Powdered soy milk is obtained by soaking whole soybeans in water for 24 hours and then grinding after removal of free water. After grinding, the beans are boiled for 1 hour in an aqueous solution constituting by weight 3 parts water to 1 part beans. The boiled beans are then pressed in cheesecloth to remove the soy milk therefrom. Such soy milk is then lyophilized to obtain the powdered soy milk. To 300 mg. of this powdered milk there is added 15 mg. of the above enzyme preparation and 10 ml. of water.

Analysis of the milk after having the enzyme preparation incorporated therein for 6 hours indicates a decrease of 80 percent of the stachyose therein when compared to a control sample maintained under the same conditions without the enzyme preparation having been incorporated.

EXAMPLE 5

A submerged aqueous 100 ml. culture comprising by weight 7 percent sucrose, 8 percent cornsteep water, 0.4 percent $(NH_4)_2SOB_4$, 0.5 percent $K_2HPO_4$ and 0.1 percent $MgSO_4 \cdot 7 H_2O$ at pH 4.5 is autoclaved and then inoculated with *Saccharomyces carlsbergensis*. After inoculation, the flask containing the submerged culture is placed on a rotary shaker for 72 hours at 30° C. under semianaerobic conditions. The culture is removed from the shaker, the cells are autolyzed with capryl alcohol and then precipitated with ethanol. The enzyme preparation so obtained exhibits a Carbohydrase Activity of 10 Carbohydrase Units per gram.

EXAMPLE 6

In a manner similar to that of example 2, the enzyme preparation derived from *Saccharomyces carlsbergensis* in example 5 is incorporated in an amount equal to 10 percent by weight of the solids in a 1,000 ml. aliquot of soy milk obtained from whole ground soybeans and containing 3 percent by weight of total solids. A control sample is also maintained under the same conditions. After 8 hours both samples are analyzed by gas liquid chromatography. Thereupon, the control sample evidences the presence of a mixture of stachyose, raffinose and melibiose, constituting 3 percent by weight of the solids in such soy milk. In the enzyme treated sample there is no indication of any significant amount of any of these flatulence-producing saccharides.

EXAMPLE 7

In a manner similar to that of example 5 a culture of *Saccharomyces cerevisiae* is grown and the enzyme preparation obtained thereby isolated. A soy milk sample containing 3 percent by weight of total solids derived from defatted soybean flakes is adjusted to a pH of 5.0 with HCl and equilibrated at 50° C. Thereafter, the enzyme preparation derived from the *Saccharomyces* is incorporated therein in an amount equal to 10 percent by weight of the solids in said soy milk. After 16 hours, the soy milk is analyzed by gas liquid chromatography which indicates the lack of any significant amount of any flatulence-producing sugar therein. A control sample of the soy milk maintained under the same conditions exhibits a mixture of stachyose, raffinose and melibiose which constitutes 3 percent by weight of the soy milk solids.

EXAMPLE 8

A mixture consisting of 20 mg. of the enzyme preparation of example 4 and 10 mg. of the enzyme preparation of example 5 is added to 300 mg. of powdered soy milk in 10 ml. of water such as described in example 4. After 16 hours, analysis of this material shows that essentially all of the stachyose and raffinose therein has been hydrolyzed.

What is claimed is:

1. A process for rendering innocuous flatulence-producing saccharides, which comprises contacting a foodstuff having such flatulence-producing saccharides incorporated therein with an enzyme preparation capable of hydrolyzing the α 1,6 linkages of stachyose in an amount and for a time which is effective to hydrolyze said flatulence-producing saccharides.

2. A process according to claim 1 wherein said process is carried out in an aqueous solution.

3. A process according to claim 2 wherein said aqueous solution comprises by weight 0.1 to 100 parts water to 1 part foodstuff.

4. A process according to claim 2 wherein the foodstuff is defatted soy milk.

5. A process according to claim 2 wherein the foodstuff is full fat soy milk.

6. A process according to claim 2 wherein the foodstuff is the solid residue resulting from the production of soy milk.

7. A process according to claim 2 wherein said process is carried out at a pH in the range of about 4.0 to 8.8 and at a temperature in the range of about 20° to 60° C.

8. A process according to claim 7 wherein said pH is maintained in the range of about 4.5 to 7.5 and said temperature is maintained in the range of about 30° to 50° C.

9. A process according to claim 7 wherein the foodstuff is contacted with said enzyme preparation for at least 1 hour.

10. A process according to claim 8 wherein the foodstuff is contacted with said enzyme preparation for 5 to 10 hours.

11. A process according to claim 1 wherein for each gram of flatulence producing saccharide there is 0.1 to 500 Carbohydrase Units of said enzyme preparation.

12. A process according to claim 11 wherein for each gram of flatulence producing saccharide there is 1 to 50 Carbohydrase Units of Carbohydrase.

13. A process according to claim 1 wherein said foodstuff is a soybean.

14. A process according to claim 1 wherein said foodstuff is a soybean derivative.

15. A process according to claim 1 wherein the said enzyme preparation is derived from a fungal, yeast or bacterial microorganism.

16. A process according to claim 15 wherein said enzyme preparation is derived from a culture selected from the group consisting of *Aspergillus*, *Rhizopus*, *Saccharomyces* and *Candida*.

17. A process according to claim 16 wherein said enzyme preparation is derived from an *Aspergillus* culture.

18. A process according to claim 17 wherein said *Aspergillus* is *Aspergillus niger*.

19. A process according to claim 1 wherein said enzyme preparation is the active ingredient in a composition comprising a carrier.

20. A process according to claim 19 wherein said enzyme preparation constitutes 1 to 99 percent by weight of said composition.

21. A process according to claim 22 wherein said enzyme preparation constitutes 5 to 25 percent by weight of said composition.

22. A process according to claim 1 wherein said flatulence-producing saccharides are characterized by containing α 1,6 linkages between hexoses.

23. A process according to claim 22 wherein the flatulence-producing saccharides are selected from the group consisting of stachyose, raffinose, melibiose, galactobiose and manninotriose.

24. A process according to claim 23 wherein stachyose is the flatulence-producing saccharide.